United States Patent [19]
Klein et al.

[11] 3,726,389
[45] Apr. 10, 1973

[54] CONVEYOR

[75] Inventors: Theodor Klein, Burbach, Germany

[73] Assignee: Siemag Siegener Maschinenbau G.m.b.H., Dahlbruch, Germany.

[22] Filed: Dec. 20, 1971

[21] Appl. No.: 209,809

[30] Foreign Application Priority Data

Dec. 18, 1970 Germany..................P 20 62 506.3

[52] U.S. Cl....................................198/179, 271/79
[51] Int. Cl...........................................B65h 29/28
[58] Field of Search.....................198/179; 271/79, 271/82, 85

[56] References Cited

UNITED STATES PATENTS

| | | |
|---|---|---|
| 2,996,982 | 8/1961 | Alm......................................271/79 |
| 3,442,506 | 5/1969 | Pasquinelli............................271/85 |

*Primary Examiner*—Richard E. Aegerter
*Attorney*—Norman S. Blodgett

[57] ABSTRACT

A conveyor for foil strip in which the edges of the strip are held by clamps as it moves along the conveyor.

11 Claims, 5 Drawing Figures

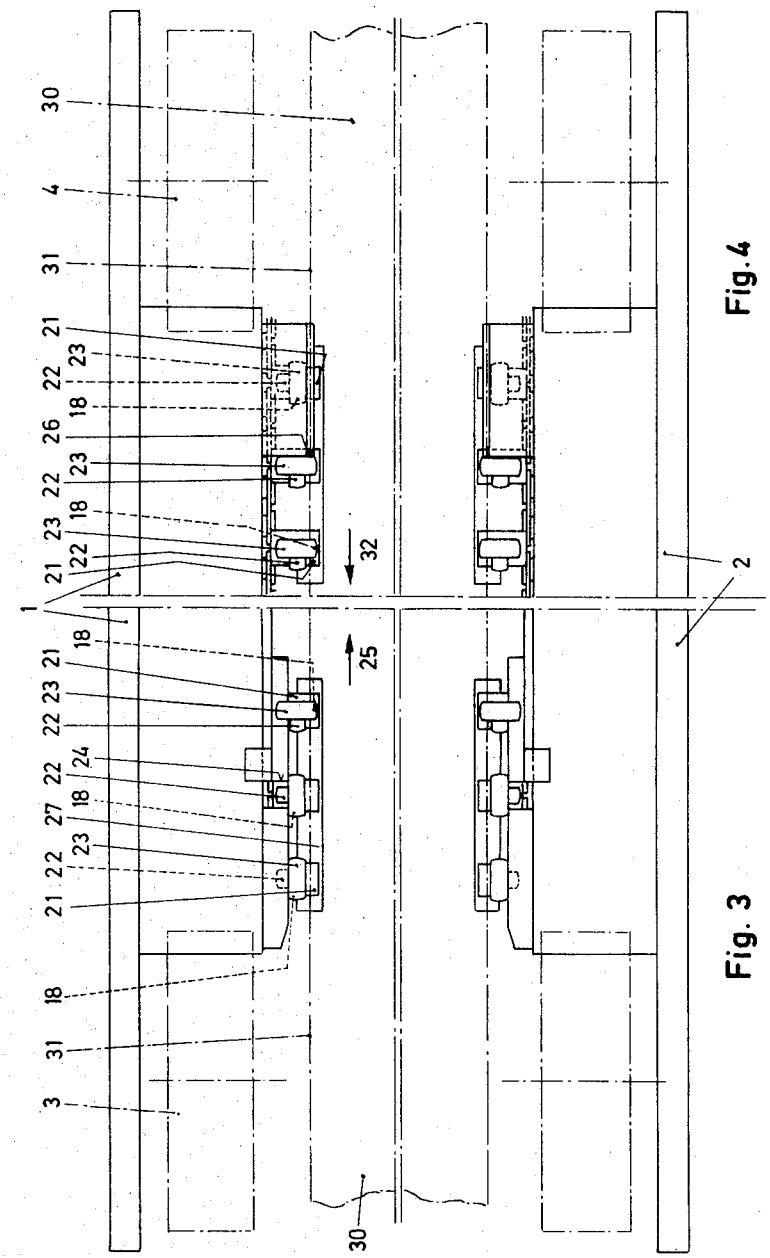

CONVEYOR

BACKGROUND OF THE INVENTION

In order to carry plastic foil inside of automatic thermal mold machines it has been the practice to use roller chains which are equipped to grip the plastic foils with special sharp points or teeth. These conveying devices, although simple in design, have the disadvantage that the penetration of the sharp points into the edge areas of the plastic foil punches part of it out. This in return, brings about the danger of the machine fouling if no special devices are provided for the removal of the punched-out plastic pieces. Furthermore, it is a disadvantage that broad strips along the edge of the plastic sheets cannot be used, which means that the material is not used to the fullest. Finally, these well-known conveyors operate with little guide accuracy and, therefore, are not satisfactory for every requirement.

Also, it has been known to provide conveyors with roller chains in which the links are equipped with clamping devices in which the clamp jaws are pressed toward each other by a spring force; for grasping or releasing the foil edges the lifting flanks are opened against the force of the spring. In the case of clamp-chain conveyors with vertically-rotating roller chains, clamping devices are known in which the clamping jaws are connected by a guide. These clamping devices however are only suitable for the clamping of thin plastic foils. Also the ability of these known clamp-chain transport devices to guide is very low. Since the upper clamp jaws on the known clamping devices during opening against the spring pressure are only lifted and are still positioned above the area where the foil is picked up, the foil has to slide over the jaws into the slot formed by the clamp jaws. With the use of thicker foils, this need is considerably more complex because the foils have to be guided within specially-shaped cross-sections, so that they may be brought into the slot. For this operation and for the performance of the conveying movement, complicated guides and longer guide tracks are necessary.

For horizontally-rotating clamp-chain conveyors clamping devices have been provided similar to a pair of shears; these require heavy conveyor chains with a correspondingly large expenditure and require a correspondingly larger space, without the requirements for exact guidance being fullfilled. These and other difficulties experienced with the prior art devices have been obviated in a novel manner by the present invention.

It is, therefore, an outstanding object of the invention to provide a conveyor which is light and simple for the controlled pick-up and holding of plastic foils which, with exact guidance of the foil path, makes it possible to safely grip and release the edges of the foil sheet.

Another object of this invention is the provision of a conveyor which suitable for carrying both thin and thick foils.

SUMMARY OF THE INVENTION

In general, the present invention has to do with a conveyor in which sprocket chains are guided parallel and also transversely of their rotating axis and movable clamping jaws are swingably supported in the clamping plane opposite stationary clamping jaws. In addition the movable clamping jaws are moved by control cams through stationary stops at the start of the conveying movement over the stationary clamping jaws and at the end of the conveying movement are able to swing back out of the vicinity of the stationary clamping jaws.

More specifically, the sprocket chains run parallel to their plane of rotation between guide tracks with the rolls positioned on link pins and the sprocket chains fixed transversely of their plane of rotation with their guide rolls in special guide grooves formed by angle pieces with plates. Also, the stationary clamping jaws of the sprocket chain are formed by angle pieces and these angle pieces carry supports for a swingable and displaceable holder for the movable clamping jaws. The lifting flanks for movable clamping jaws are formed by the circumferential area of turnable discs to which the clamping jaws are connected with spring supported push rods which extend downwardly over the contour lines of the chain links.

Structurally, it is especially of advantage according to this invention, if the push rods of the movable clamping jaws are positioned within sleeves and so connected with the angle pieces of the chain bars; the sleeves are surrounded by springs which are supported on one side by the sleeve and on the other side on the free end of the push rods. Every movable clamping jaw is equipped with two control cams located in circumferential direction of their push rods by 90° as also in direction of the axis to each other displaced in height. Stops extend into the moving path at the start and finish of the conveying movement.

During the set-up of the automatic thermal-mold machine and the conveyor, a forward and backward movement is possible without damage to the plastic foil. This is brought about by arranging at the start of the transport movement two stops located one after the other at different height positions where the contact areas are opposite each other in front of and in back of a vertical plane through the axis of the front lifting disc. The lower contact area is located in direction of travel of the sprocket chain behind this axis plane. By means of this arrangement it is possible that, during forward movement of the sprocket chain, the lower control cam of the movable clamping jaws runs up against the lower contact area as soon as the push rods (and with them the clamping jaws by them) are lifted from the stationary clamping jaws by the lifting disk. By this means the movable clamping jaws are forcibly actuated and moved with a swinging movement over the edges of the foil which are positioned on the stationary clamping jaws. On the other hand, during rearward movement of the sprocket chain, the upper control cams of the movable clamping jaws engage the higher contact area as soon as the push rods are lifted by the lifting disc. At the same time the movable clamping jaws are also forcibly actuated and moved away from the area of the edges of the foil, which edges are resting on the stationary clamping jaws.

In order that rearward movement of the sprocket chain is possible without interference with the lower stop, a further suggestion of this invention is that the stop with its contact area is swingable upwardly about a horizontal axis which is positioned longitudinally behind the contact area and is equipped with a control area for upward swinging of the stop from the contact area in an upwardly sloping direction from the support axis.

In order that the movable clamping jaws in every case be movable only through 90°, the contact areas at the start of the conveying travel (referring to the swinging axis of the movable clamping jaws) are active at the beginning and the contact areas on the end of the travel positioned on the opposite circumferential side of the push rods are operative on the control cam which is provided.

A secure grip on the foil edges between the clamping jaws is assured by equipping the clamping jaws with the teeth or grooves. It is also practical, for good guidance to design the clamping chains as double roller chains. Finally, it is of advantage for the operation of the clamping chain conveyor to equip the free ends of the push rods (which work together with the lifting discs) with rounded tops, which prevents the edge pressure during impact of the push rods to the circumference of the lifting disc.

BRIEF DESCRIPTION OF THE DRAWINGS

The character of the invention, however, may be best understood by reference to one of its structural forms, as illustrated by the accompanying drawings, in which:

FIG. 3 is a partial schematic plan view of the section shown in FIG. 1, FIG. 4 is a partial schematic plan view of the section shown in FIG. 2.

Figure 1:
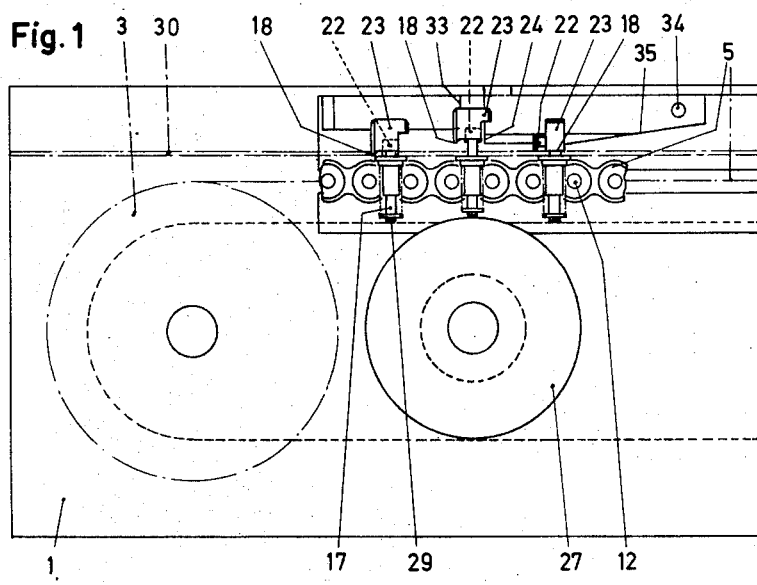
FIG. 1 is a partial schematic side view of the front end section of a conveyor constructed in accordance with the present invention.
Figure 2:
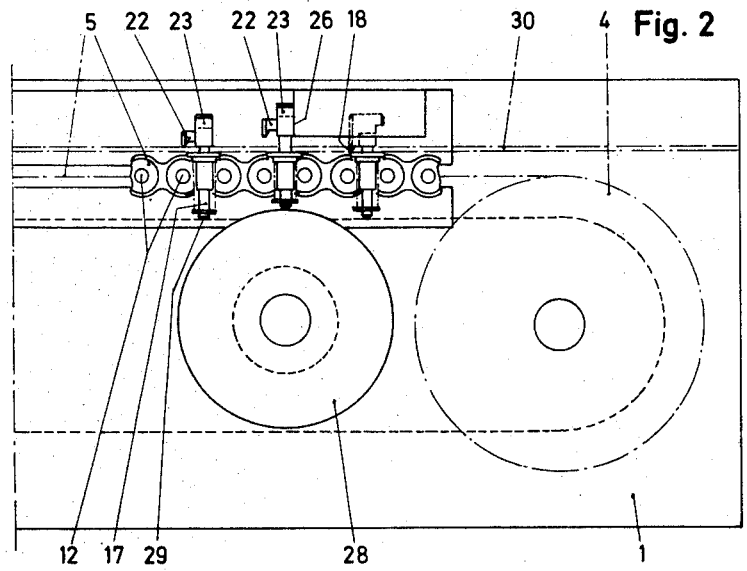
FIG. 2 is a partial schematic side view of the rear end section of the conveyor.

Referring the the drawings, the conveyor is shown as having spaced, parallel side frames 1 and 2 opposing each other at a certain distance, which distance may be adjusted. On each one of these side walls 1 and 2 is supported a front chain wheel 3 (FIGS. 1 and 3) and a rear chain wheel 4 (FIGS. 2 and 4). The two chain wheels 3 are supported with their axes in line and are driven together by a motor (not shown). In the case of the adjustment of the distance between the two side walls 1 and 2, the chain wheels 3 are connected with the shaft by wedges. The wedges engage a longitudinal groove in the shaft, are secured against turning, but are displaceable longitudinally.

Figure 5:
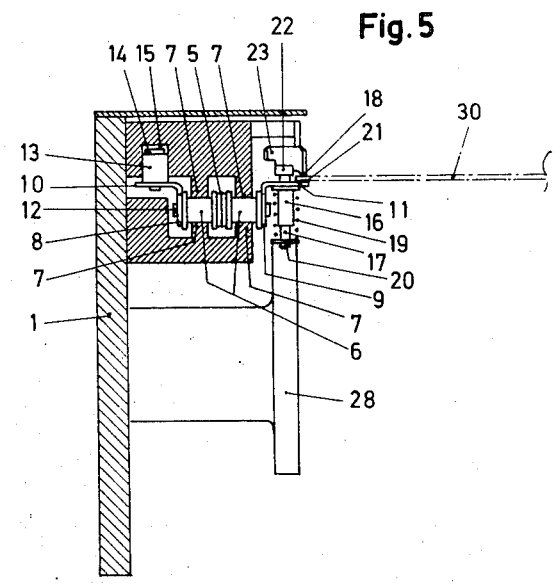
FIG. 5 is a vertical sectional view of the section of the conveyor shown in FIG. 2.

Around the two chain wheels 3 and 4, which are supported in the side walls 1 and 2, respectively, is positioned a chain belt 5 which is designed as a double-roller chain. At least the upper run of this chain 5 passes with its pair of rollers 6 (See FIG. 5) between guide bars 7 which, in turn, are securely fastened to the side walls 1 and 2. Outer side bars 8 and 9 of the double-roller chain 5 each carry an angle piece 10 and 11, respectively, which extends parallel to the roller 6. On each of the angle pieces 10 is mounted a guide roll 13 on a support shaft 14. The roll 13 is positioned at a right angle to the link pin 12. All guide rolls 13 engage a guide groove 15 which runs parallel to the guide bars 7.

The double-roller chain 5 is supported by the guide bars 7 transversely to the longitudinal axis of the link pins 12 practically without play and the guide rolls 13 give a nearly play-free guidance to the roller chain. To the underside of each angle piece 11 is fastened a bushing 16 which lies at a right angle to the link pin 12. In every bushing 16 is carried a push rod 17 which extends out of the bushing at the lower end and carries on its upper end a clamping jaw 18. A spring 19 is supported with one end engaging the underside of the angle piece 11 and with the other end pressing against a collar 20 which is located adjacent the lower end of the push rod 17. Through this arrangement, the clamping jaw 18 is pressed on top of the angle piece 11 and the free end of the angle piece 11 forms a clamping jaw 21.

The push rod 17 isrotatably supported is rotatably the sleeve 16 so that the clamping jaw carried by the push rod is also swingable relative to the angle piece 11 and the the clamping jaw 21 formed by the angle piece.

The twist of the clamping jaws 18 is brought about by control cams 22 and 23 which are offset relative to each other at a right angle. They are connected tightly to the push rod 17 and to the clamping jaw 18. During the operation, the control cams 22 at the incoming (front) end of the clamping chain conveyor act together with a stop 24, which is turned by the moving chain 5 in the direction of the arrow 25, to bring the clamping jaws 18 forceably onto the clamping jaws 21. At the exit (rear) end of the conveyor a control cam 23 and a stop 26 act together to turn the clamping jaws 18 (also forceably) back and out of the area of the clamping jaws 21.

So that the clamping jaws 18 do not rest on the top of the clamping jaws 21 during the turning operation, rotating disks 27 are connected to the side walls 1 and 2, at the front of the conveyor and to the rear are attached corresponding disks 28. These disks are arranged in such a way that the push rods with a cone-shaped surface 24 on the free end slide over the circumferential surface of the disks and, by acting against the springs 19 and 20, the rods are pushed upwardly before the control cams 22 touch the stop 24 or the control cams 23 engage the stop 26. In this way, the clamping jaws 18 are forceably lifted from the clamping jaws 21 on the angle piece 11.

On the front end of the conveyor are mounted the movable clamping jaws 18 which are positioned away from the stationary clamping jaws 21, so that the plastic foil or sheet 30 to be transported by the device may run along with the longitudinal edges 31 resting on top of the stationary clamping devices 21 without any hinderance, as can clearly be seen in FIG. 3. Thereafter, the clamping jaws 18 are lifted by the passage of their push rods 29 over the top of the circumference of the disk 27 and by the control cams 22 engaging the stop 24, so that they are turned 90° over the foil edge 31 and the clamping jaws 21. During further movement of the double roller chain 5, the push rods 17 run off the circumference of the disk 27, so that the clamping jaws 18 are moved downwardly by the springs 19. The foil edge 31 is now clamped between the clamping jaws 18 and 21 independantly of the sheet thickness and kept tight during its passage through the continued path of the double-roller chain 5.

At the rear end of the conveyor, the individual push rods 17 run up onto the circumference of the disks 28 and are pushed upwardly against the action of the spring 19. In this way, the clamping jaws 18 are lifted from the foil edge 31 and also from stationary clamping jaws 21 before the control cams 23 touch the stop 26.

When the stop 26 is touched by the control cam 23, the clamping jaws 18 are turned so that they are out of the area of clamping jaws 21 and away from the edges of the sheet 30 and the foil may run out freely from the conveyor.

During the setting-up of the automatic thermal-molding machine, the conveyor may be moved forwardly (corresponding to the direction of the arrow 25) as well as backwards (corresponding to the direction of the arrow 25) without the foil edges 31 being damaged by the clamping jaws 18 during backward movement. Special provisions are made which, during backward movement, lift the clamping jaws 18 and then turn them back out of the area of the clamping jaws 21. For this purpose, the two control cams 22 and 23 are arranged at a different elevation. In addition, another stop 33 is provided at the front end of the conveyor and the stop 24 is arranged in such a way that it is swingable upwardly about a pivotal axis 34.

During backward movement of the double-roller chain 5 (corresponding to the direction of the arrow 32) the higher-positioned control cams 23 may pass the stop 24 without touching it, as long as the clamping jaws 18 are still engaged with the clamping jaws 21. By the upward movement of the push rods 17 on the circumference of the disks 27, the clamping jaws 18 again are lifted, before the control cam 23 touches the stop 33. In this manner, the sheet edges are again free and the clamping jaws 18 are turned back into their original positions before the push rods 17 run off the circumference of the disks 27. The stops 22 of the clamping jaws (which have passed the stop 26 already and therefore are not in engagement anymore) pass, during backward movement, underneath a sloped area 35 of the stop 24. By this operation and by running over the disk 27, the stop 24 is lifted. The stop 33 will not be touched during this operation.

During forward movement of the double-roller chain 5 and also during backward movement the turning of the clamping jaws 18 is only possible when the clamping jaws 18 are lifted from the clamping jaws 21 and from the sheet edges 31. The stops 24 and 33 are then always in such a position to the vertical axis plane of the rolls 27 (with reference to the corresponding direction of movement of the double-roller chain 5) that the control cams 22 and 23 touch only when the stops of the clamping jaws 18 are completely lifted. On the other hand, the stop 26 is displaced relative to the plane of the vertical axis of the disk 28 in such a way that the clamping jaws 18 are lifted without question before the control cam 23 touches the stop 26 to turn the clamping jaws 18 out of the area of the clamping jaws 21. The clamping area of the clamping jaw may be smooth. Often, however, it is also practical to equip the jaws with teeth or grooves.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A conveyor of the clamping-jaw type for use with a plastic sheet inside of an automatic thermal-molding machine, in which sprocket chains move along guides with spring clamping devices arranged on a plurality of side bars of the chain and in which the spring clamping devices engage the edges of the sheet on lifting flanks at the beginning of the conveying path in control dependance and release them at the end of the path, the spring clamping devices always consisting of a stationary clamping jaw and of a clamping jaw movable vertically above the stationary clamping jaw, characterized by the fact that the sprocket chains (5) are guided parallel to and transversely of the rotating axes (6,7,13, and 15) and the movable clamping jaws (18) are swingably supported and parallel to the clamping plane opposite the fixedly-arranged clamping jaws, and the movable clamping jaws (18) are able to swing, with the help of control cams (22,23) and stationary stops (24,26,and 33) at the beginning of the transport path, over the stationary clamping jaws (21), and out of the area above the stationary arranged clamping jaws (21) at the end of the transport path.

2. A conveyor as recited in claim 1, wherein the sprocket chains (5) run between guide bars (7) parallel to their rotating plane on link pins (12) and their links carry rolls (6) and the sprocket chains are fixed within guide grooves (15) extending transversely of their rotating area by guide rolls (13) resting on angle pieces (10).

3. A conveyor as recited in claim 2, wherein the stationary clamping jaws (21) of the sprocket chain (5) are formed by angle pieces (11) and their bars (9) and these angle pieces (11) carry supports (16) for the swingable and displaceable holder of the movable clamping jaws (18).

4. A conveyor as recited in claim 3, wherein the lifting flanks for the movable clamping jaws (18) are formed by circumferential areas of rotating disks (27 and 28) on which the clamping jaws (18) run up with spring loaded push rods (17) and wherein the latter extend downwardly beyond the chain links.

5. A conveyor as recited in claim 4, wherein the push rods (17) of the movable clamping jaws (18) are supported within bushings (16) connected with the angle pieces (11) of chain bar (9), and wherein the push rods (17) are surrounded by springs (19) which are supported on one end on the bushings (16) and on the other end engage a collar (20) on the free end of the push rod (17).

6. A conveyor as recited in claim 5, wherein every movable clamping jaw (18) is equipped with two control cams (22,23) in the direction of its push rod (17) at 90° to each other and vertically displaced, and wherein the stops (24,26,and 33) extend into the moving path of the control cams (22,23) during the beginning and at the end of the conveying operation.

7. A conveyor as recited in claim 6, wherein at the beginning of the conveying path are arranged two stops (24,33) located longitudinally one after the other and at different elevations, the contact areas being positioned opposite each other spaced longitudinally before and behind a vertical plane in the axis of the front lift-disk (27), the lower-positioned contact area (24) being located in the direction (25) of movement of the sprocket chain (5) behind this axis plane.

8. A conveyor as recited in claim 7, wherein the stop (24) containing the lower-positioned contact area, is supported in such a way that it is swingable about a horizontal axis (34) positioned some distance behind the contact area, and wherein the stop (24) is equipped with a control area (35) which inclines upwardly of the support axis from the contact area in direction for the swinging stop (24).

9. A conveyor as recited in claim 8, wherein the contact areas (24 and 33) are operative at one circumferential side of the push rods (17) at the start of the transport path with reference to the swing axis of the movable clamping jaws (18) and the contact areas (26) are operative at the end of the transport path and on the opposite circumferential side of the push rods (17).

10. A conveyor as recited in claim 9, wherein the clamping areas (18,21) are equipped with serrations.

11. A conveyor as recited in claim 10, wherein the clamping chains (5) are designed as double-roller chains.

* * * * *